United States Patent
Sahoo et al.

(10) Patent No.: US 10,104,011 B2
(45) Date of Patent: Oct. 16, 2018

(54) SYSTEM AND METHOD FOR DETERMINATION OF PARTITION IDENTIFIERS IN A MULTITENANT APPLICATION SERVER ENVIRONMENT

(71) Applicant: Oracle International Corporation, Redwood Shores, CA (US)

(72) Inventors: Sanjeeb Sahoo, Cupertino, CA (US); Sivakumar Thyagarajan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 348 days.

(21) Appl. No.: 14/866,515

(22) Filed: Sep. 25, 2015

(65) Prior Publication Data

US 2016/0094474 A1    Mar. 31, 2016

Related U.S. Application Data

(60) Provisional application No. 62/055,068, filed on Sep. 25, 2014.

(51) Int. Cl.
*G06F 15/16* (2006.01)
*H04L 12/923* (2013.01)
(Continued)

(52) U.S. Cl.
CPC ............ *H04L 47/762* (2013.01); *G06F 9/461* (2013.01); *H04L 67/10* (2013.01)

(58) Field of Classification Search
CPC ........ G06F 9/461; H04L 47/762; H04L 67/10
See application file for complete search history.

(56) References Cited

U.S. PATENT DOCUMENTS

2007/0067435 A1*  3/2007  Landis ................ G06F 9/5016
                                                    709/224
2010/0023937 A1   1/2010  Kothari et al.
(Continued)

OTHER PUBLICATIONS

European Patent Office, International Searching Authority, International Search Report and Written Opinion dated Jan. 29, 2016 for International Application No. PCT/US2015/052469, 14 pages.

*Primary Examiner* — Normin Abedin
(74) *Attorney, Agent, or Firm* — Tucker Ellis LLP

(57) ABSTRACT

In accordance with an embodiment, described herein is a system and method for determination of partition identifiers in an application server environment. An exemplary method can begin with providing, at one or more computers, including an application server environment executing thereon, together with a plurality of deployable resources which can be used within the application server environment, one or more partitions, wherein each partition provides an administrative and runtime subdivision of a domain, and a component invocation context manager, the component invocation context manager comprising a stack. The method can set one or more component invocation contexts. The partition-aware container can perform one of registering or looking up a current component invocation context at the component invocation context manager. The current component invocation context can be associated with a current partition. The method and system can be utilized in multi-tenant as well as non-multitenant application server environments.

20 Claims, 9 Drawing Sheets

(51) Int. Cl.
*H04L 29/08* (2006.01)
*G06F 9/46* (2006.01)

(56) References Cited

U.S. PATENT DOCUMENTS

| | | | |
|---|---|---|---|
| 2011/0213870 A1* | 9/2011 | Cai | H04L 67/10 709/223 |
| 2012/0221694 A1 | 8/2012 | Darcy | |
| 2014/0075520 A1 | 3/2014 | Subramanian et al. | |

\* cited by examiner

SYSTEM AND METHOD FOR DETERMINATION OF PARTITION IDENTIFIERS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR DETERMINATION OF PARTITION IDENTIFIERS IN A MULTITENANT APPLICATION SERVER ENVIRONMENT", Application No. 62/055,068, filed Sep. 25, 2014; and is related to U.S. Patent Application titled "SYSTEM AND METHOD FOR SUPPORTING MULTI-TENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for determination of partition identifiers in multitenant application server environment.

BACKGROUND

Application servers generally provide a managed environment within which software applications can be deployed and run. Cloud-based environments allow applications to run within and take advantage of the distributed resources provided by a cloud. Such environments can support large numbers of users or tenants, some of which may have specific requirements that are particular to that user or tenant.

SUMMARY

In accordance with an embodiment, described herein is a system and method for determination of partition identifiers in an application server environment. An exemplary method can begin with providing, at one or more computers, including an application server environment executing thereon, together with a plurality of deployable resources which can be used within the application server environment, one or more partitions, wherein each partition provides an administrative and runtime subdivision of a domain, and a component invocation context manager, the component invocation context manager comprising a stack. The method can set, at a partition-aware container, one or more component invocation contexts. The partition-aware container can perform one of registering or looking up a current component invocation context at the component invocation context manager. The current component invocation context can be associated with a current partition.

In accordance with an embodiment, the methods and systems described herein in the context of a multi-tenant operating environment can also be used within a non-multi-tenant operating environment, as described below in the example wherein a servlet calls an EJB container.

In accordance with an embodiment, a partition, such as a partition within a domain in a WebLogic environment, can be positioned as a tenant within a domain. The present system and method can allow for early identification of tenant requests in a generic manner (i.e., generic meaning the system and method can identify tenant requests within a multi-tenant application server environment as well as a non-multi-tenant application server environment).

DETAILED DESCRIPTION

In accordance with an embodiment, described herein is a system and method for determination of partition identifiers in an application server environment. An exemplary method can begin with providing, at one or more computers, including an application server environment executing thereon, together with a plurality of deployable resources which can be used within the application server environment, one or more partitions, wherein each partition provides an administrative and runtime subdivision of a domain, and a component invocation context manager, the component invocation context manager comprising a stack. The method can set, at a partition-aware container, one or more component invocation contexts. The partition-aware container can perform one of registering or looking up a current component invocation context at the component invocation context manager. The current component invocation context can be associated with a current partition.

In accordance with an embodiment, the methods and systems described herein in the context of a multi-tenant operating environment can also be used within a non-multitenant operating environment, as described below in the example wherein a servlet calls an EJB container.

In accordance with an embodiment, a partition, such as a partition within a domain in a WebLogic environment, can be positioned as a tenant within a domain. The present system and method can allow for early identification of tenant requests in a generic manner (i.e., generic meaning the system and method can identify tenant requests within a multi-tenant application server environment as well as a non-multi-tenant application server environment).

Application Server (e.g., Multi-Tenant, MT) Environment

Figure 1:
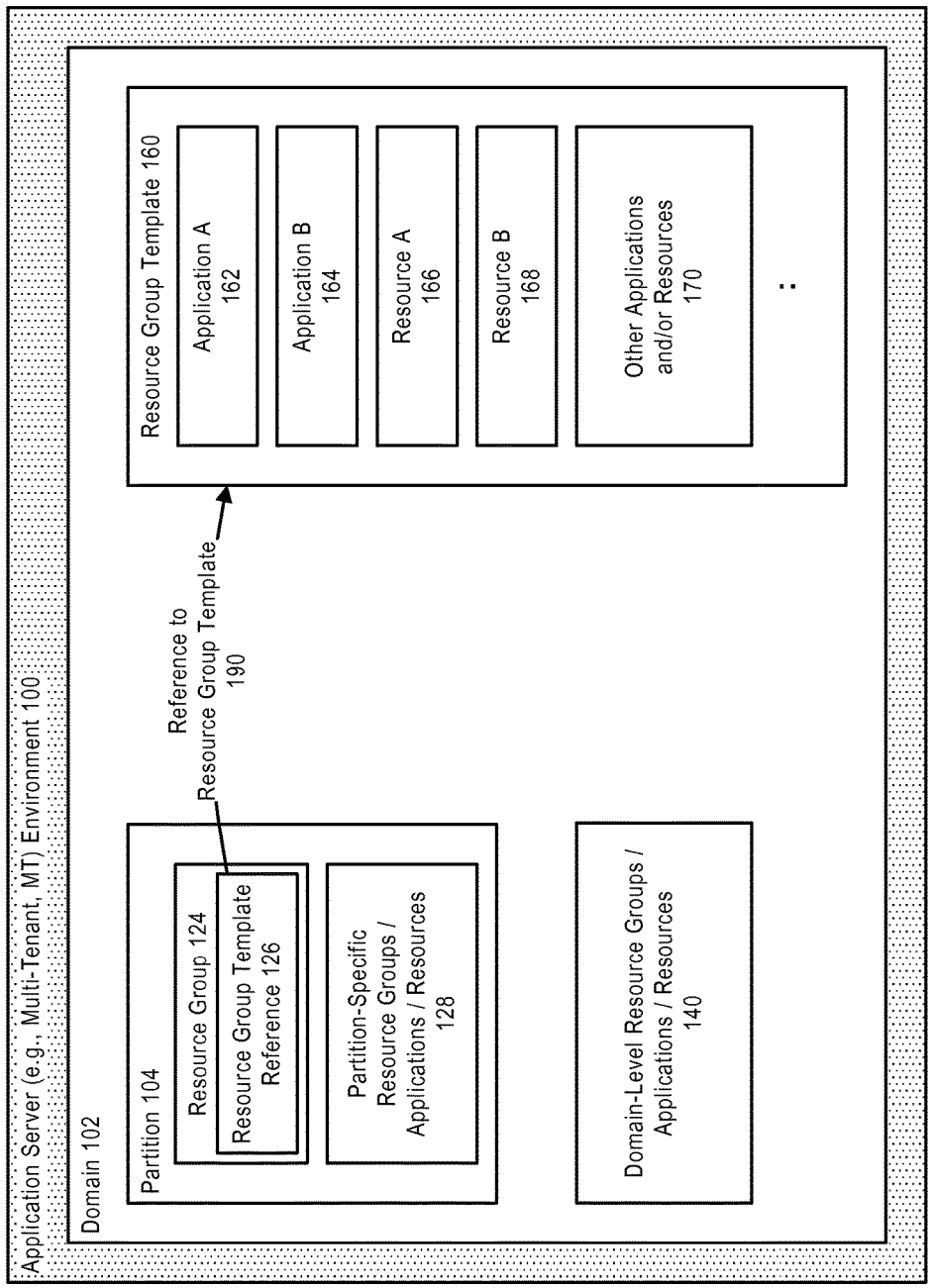
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
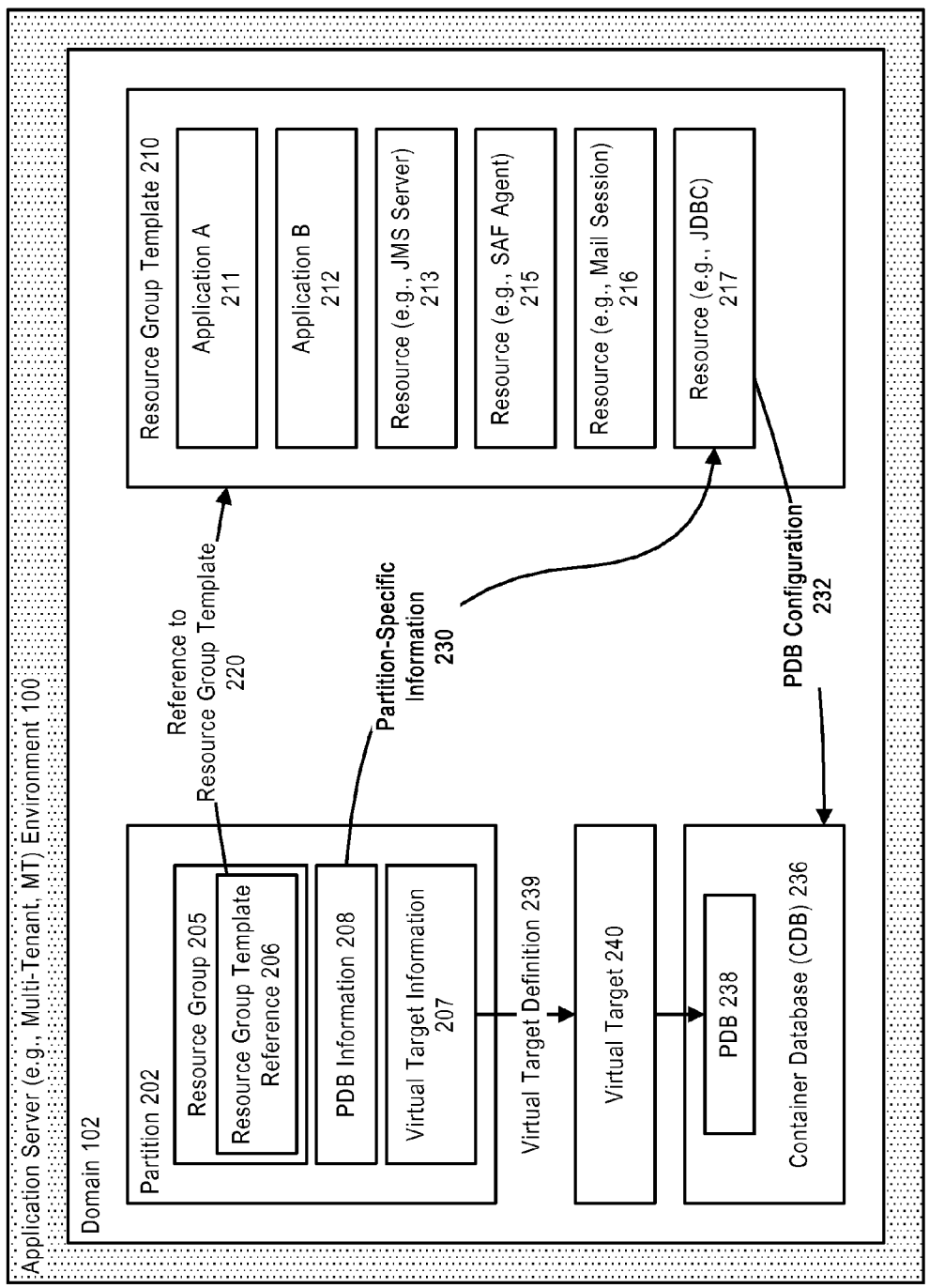
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB), or other data source, information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, or other data source, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
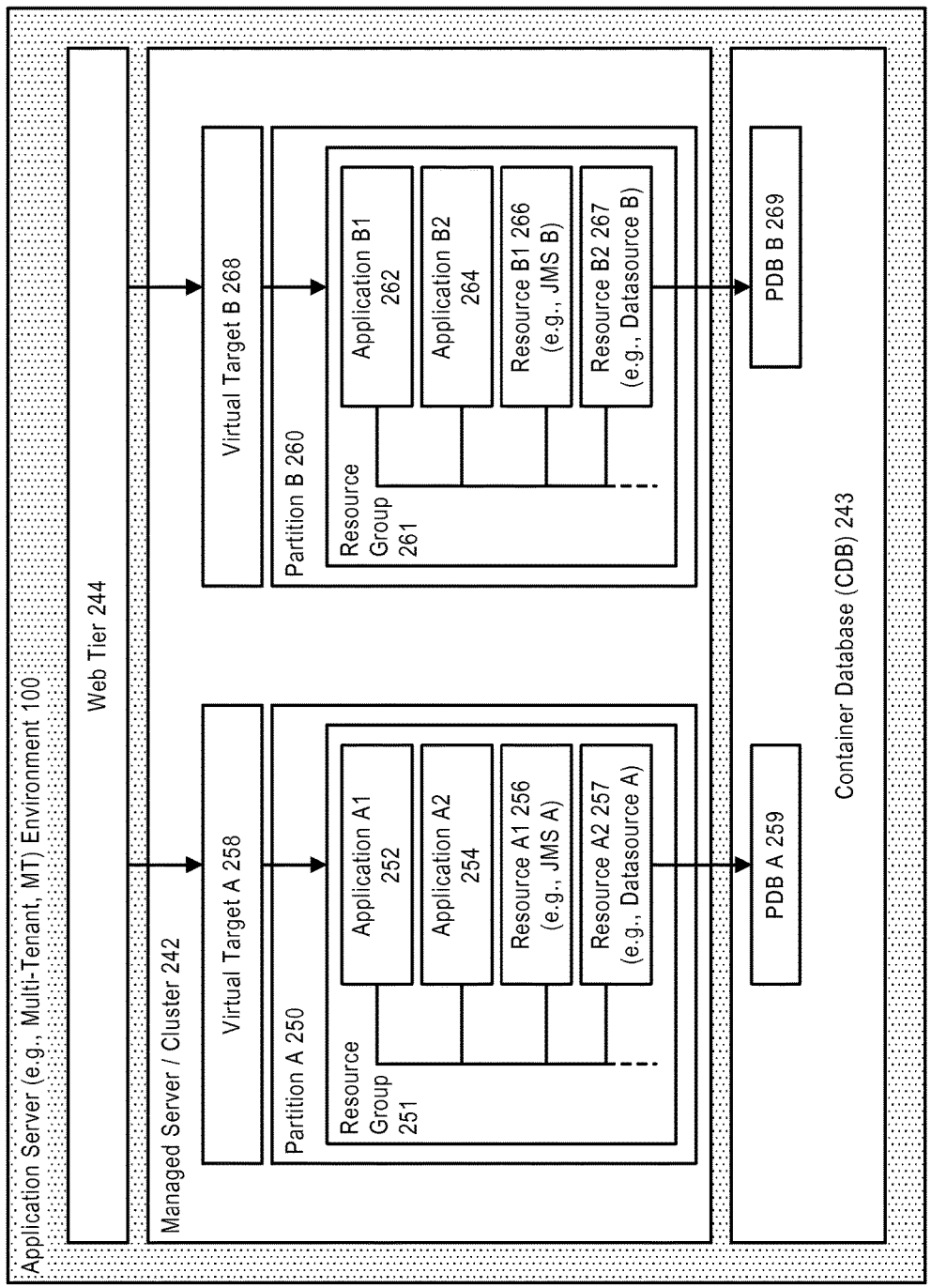
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource can be a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates. A partition can also be associated with a tenant or a platform tenant.

In accordance with an embodiment, a partition can contain applications, refer to domain wide applications via resource group templates, and have its own configuration.

In accordance with an embodiment, a resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

At the partition level, an administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

Resource Group Templates

In accordance with an embodiment, a domain can optionally include a resource group template. A resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

Tenants

In accordance with an embodiment, a tenant can be associated with a partition ID. For example, tenants can be associated with distinct user organizations, such as different external companies, or different departments within a particular enterprise (e.g., HR and Finance departments).

In accordance with an embodiment, the system enables isolation of the administration and runtime of different tenants (i.e., partitions) from each other. For example, authorized users (e.g., of partition user organizations) can configure some behaviors of applications in the associated partitions, and resources to which they have access. The system can ensure isolation between tenants; and, at run-time, that the applications working on behalf of a particular tenant refer only to resources associated with that tenant, and not to resources associated with other tenants.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
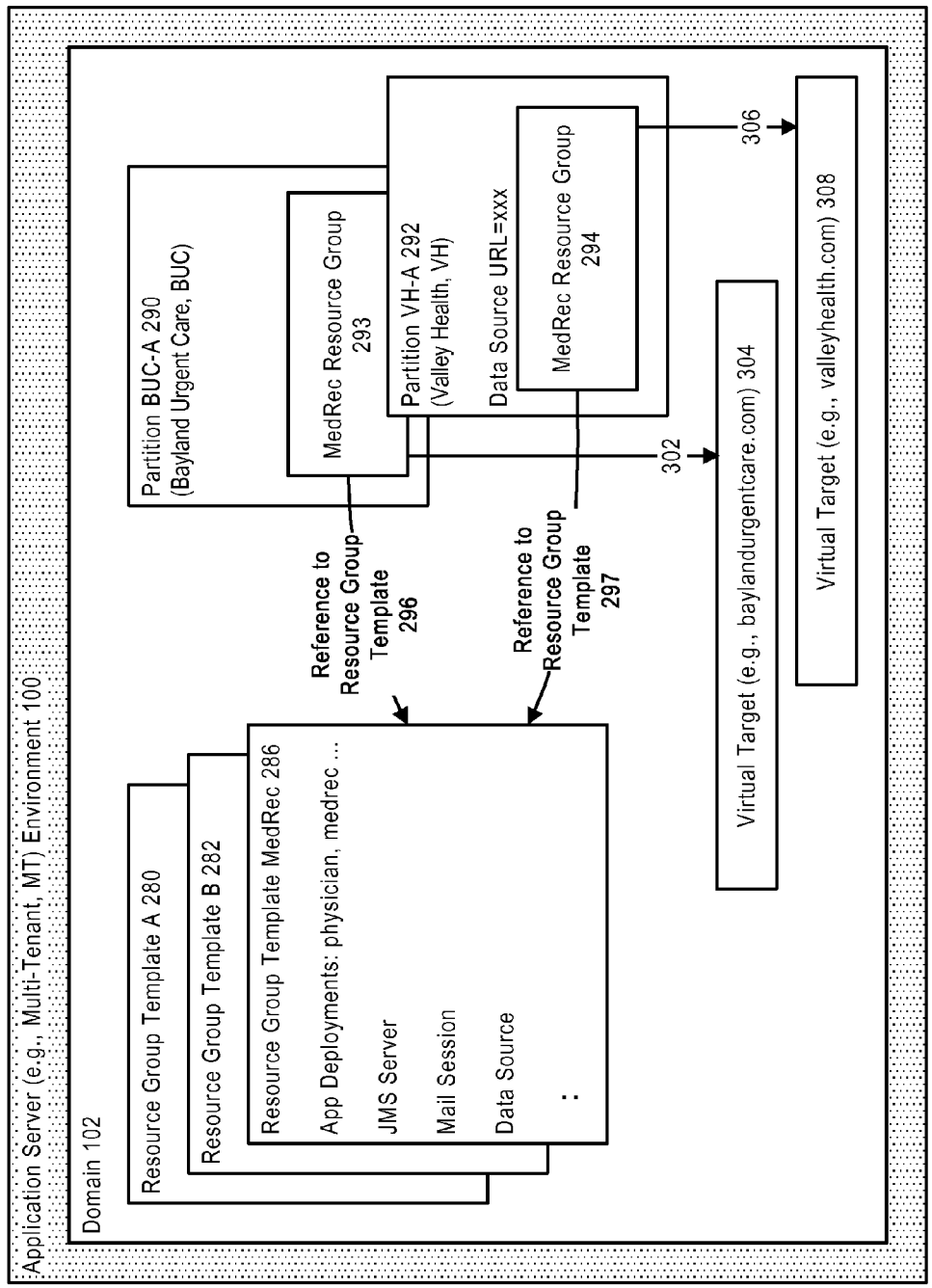
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
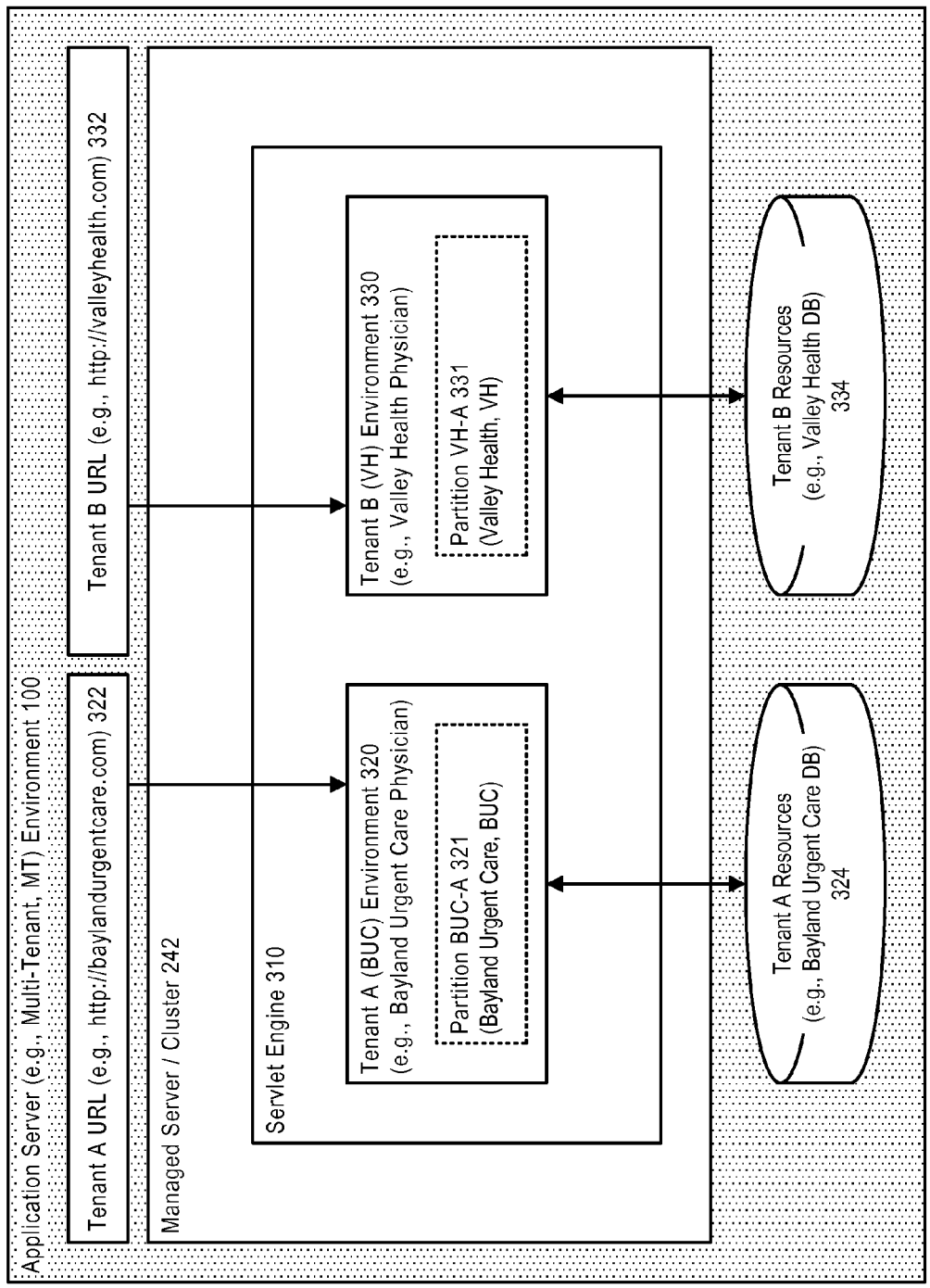
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland Urgent care database, or a Valley Health database respectively. The database instances can use compatible schemas, since the same application code will execute against both databases. When the system starts the partitions, it can create the virtual targets and connection pools to the respective database instances.

Partition Identifiers

In accordance with an embodiment, within an application server environment, containers, such as JNDI (Java Naming and Directory Interface), JMX (Java Management Extensions), Logging, Web Container, and RCM (Resource Consumption Management), can determine a partition ID of a current or running request in order to use it for partition-specific processing, logging, and isolation needs.

In accordance with an embodiment, for a component invocation request, or generally any other request received at an application server, a target resource of the request can reside within a partition in a domain. The partition that the target resource resides in (i.e., the target resource of the request), can determine the partition context for the request.

In accordance with an embodiment, internal server activities can be treated differently. For example, internal server activities can be specifically carried out for particular/individual partitions within a domain (e.g., rotation of log files belonging to a partition). For such internal server activities, the partition context can be the partition for which the activity is being performed instead of the partition within which the target resource resides.

In accordance with an embodiment, other internal server activities are not attributable to any individual/particular partition. Such internal server activities include, but are not limited to, initialization and/or shutting down of server runtime, loading of containers, and the like. For such activities that are not attributable to a particular partition, the partition context can be set to a generic value.

Figure 6:
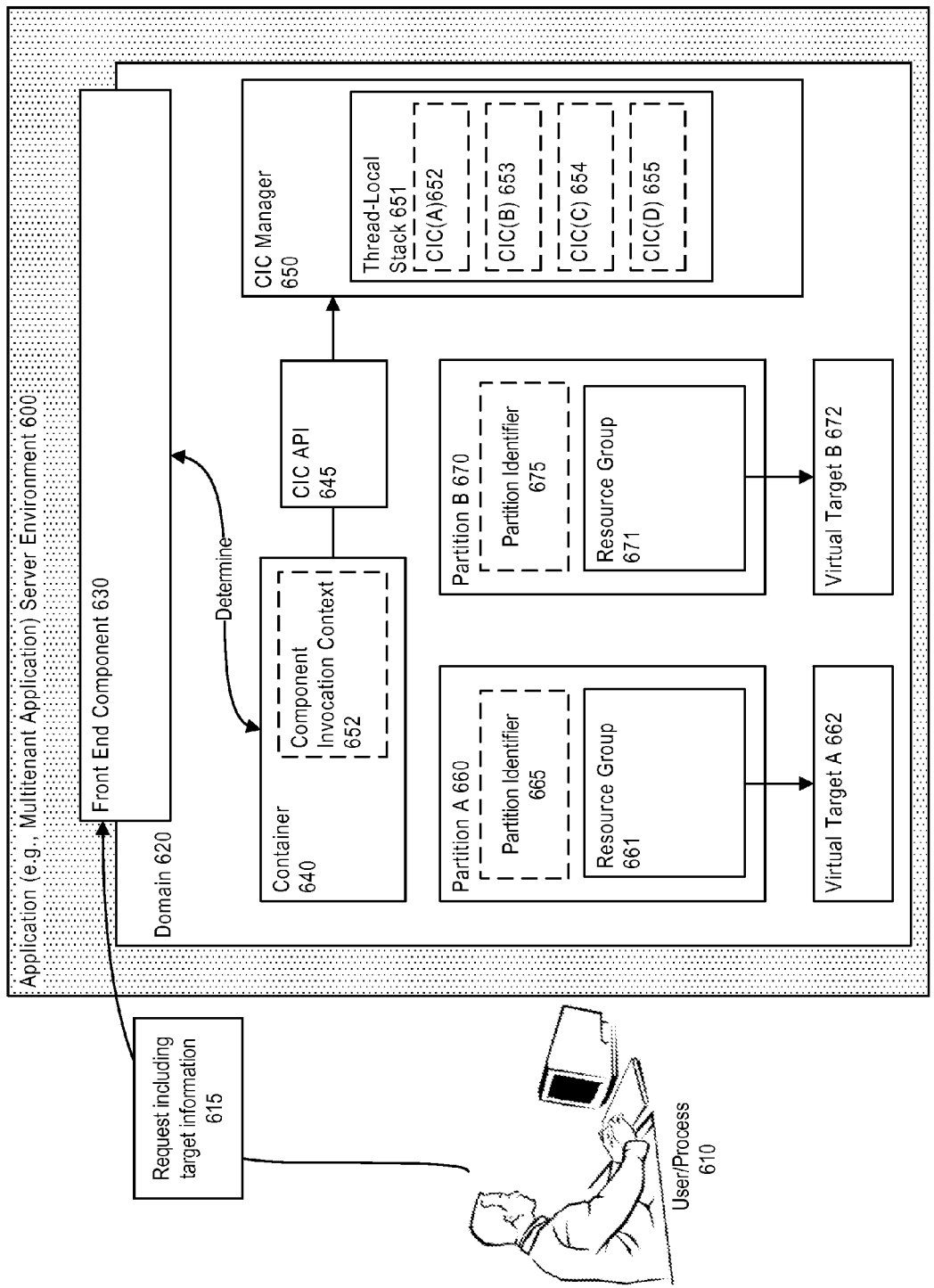
FIG. 6 illustrates determination of partition identifiers in a multitenant application server environment, in accordance with an embodiment.

FIG. 6 illustrates determination of partition identifiers in an application server environment, in accordance with an embodiment. In the embodiment depicted in FIG. 6, an application server environment 600 includes a domain 620. The domain 620 can be associated with a front end component 630, and can contain a container 640, CIC (component invocation context) API 645, component invocation context manager (CIC manager) 650, partition A 660, partition B 670, virtual target A 662, and virtual target B 672. The front end component can be any front end component capable of handling incoming requests, such as, for example, Oracle™ Traffic Director. The container 640 can be a partition aware container, such as, for example, JNDI, JMX, Logging, RCM, and the like. Partitions A and B can contain resource groups 661 and 671, respectively. Resource groups 661 and 671 can be associated with virtual targets A and B, 662 and 672, respectively. The CIC manager 650 can contain a stack, such as a thread-local stack 651.

In accordance with an embodiment, a user or process 610 can initiate a request 615, wherein the request includes target information for the target of the request within the domain 620. For example, an authorized user of partition A 660 can request that a certain application within partition A be run. In this situation, the target information associated with the request 615 would identify, at least, partition A as the target of the request.

In accordance with an embodiment, when a request, such as request including target information 615, is directed to the domain 620, it can be routed to the front end component 630, such as a traffic director. Once received at the front end component 630, the container 640 can determine various details of the request's target component/resource. These details can be obtained, for example, by examining the target information contained within the request. Once the container 640 has determined the target component/resource of the request, the container can create a component invocation context 652, which can be returned as an object representing the invocation. In accordance with an embodiment, the determined component invocation context 652 can be associated with, dependent upon the request, partition identifier 665 or 675.

As an example of a container determining the details of an incoming request and creating a component invocation context object, suppose the incoming request 615 is a HTTP request. Through a URI of the incoming HTTP request, the web (HTTP) container can determine the partition ID, application ID, module and component ID that the HTTP request is targeted to. This determination can happen, for example, in a socket reader thread by a HTTP protocol handler after enough information is read from the request so that the request's target can be discriminated. Based on this information, the container can create an object, the component invocation context, for the incoming HTTP request.

In accordance with an embodiment, when a request is directed to the domain 620, it can be routed to the front end component 630, such as a traffic director. Once received at the front end component 630, the container 640 can determine various details of the request's target component/resource. These details can be obtained, for example, by examining the target information contained within the request. Once the container 640 has determined the target component/resource of the request, the container can create a component invocation context 652, which can be an object to represent the invocation. In accordance with an embodiment, the determined component invocation context 652 can be associated with partition identifier 665 or 675.

In accordance with an embodiment, once the container makes a determination and creates a component invocation context of an incoming request, i.e., the object, the container can then register the component invocation context in the component invocation context manager 650, which can contain a stack, for example a thread-local stack 651 which in turn includes various component invocation contexts, e.g., component invocation contexts (A)-(D) 652-655. Note that the thread-local stack 651 can contain any number of component invocation contexts and is not limited to the four component invocation contexts as depicted in FIG. 6. The component invocation context manager 650 can allow for look-up, registration and deregistration of a current component invocation context.

In accordance with an embodiment, the container can register the component invocation context object directly into the component invocation context manager via CIC API 645. The container can accomplish this direct registration of the component invocation context using a command, such as pushComponentInvocationContext, to push the determined component invocation context for the request. A container that utilizes such a method to register a new component invocation context at the component invocation context manager can also handle the unsetting/unregistering of the component invocation context once the invocation associated with the request has completed. It is not a requirement for the container to unregister/unset the component invocation context at the component invocation context manager only after successful completion of the invocation. An unsuccessful invocation, such as an invocation resulting in an exception being thrown, can also result in the container unsetting/unregistering the component invocation context at the component invocation manager. The unsetting/unregistering of the component invocation context at the component invocation context manager can be performed via a command, such as popComponentInvocationContext, on the component invocation context manager.

In accordance with an embodiment, the container can register the component invocation context object directly into the component invocation context manager via CIC API 645. The container can use a runAs method by passing a callabe to execute. In this situation, the component invocation context manager can establish the component invocation context. This allows the container to run the action in the context of a component invocation context, execute the action, and unset the component invocation context after the invocation has completed.

In accordance with an embodiment, the container can register the component invocation context object directly into the component invocation context manager via CIC API 645. The container can use an AutoCloseable returned by setCurrentComponentInvocationContext method within a try-with-resources style block. In this case, the CIC manager can automatically unset the invocation context at the end of the try-block through the AutoCloseable. This approach can provided advantages, such as a caller not having to modifying work into a Runnable or a Closeable, while still having the advantages of the CIC Manager establishing the correct CIC context while executing the work.

Figure 7:
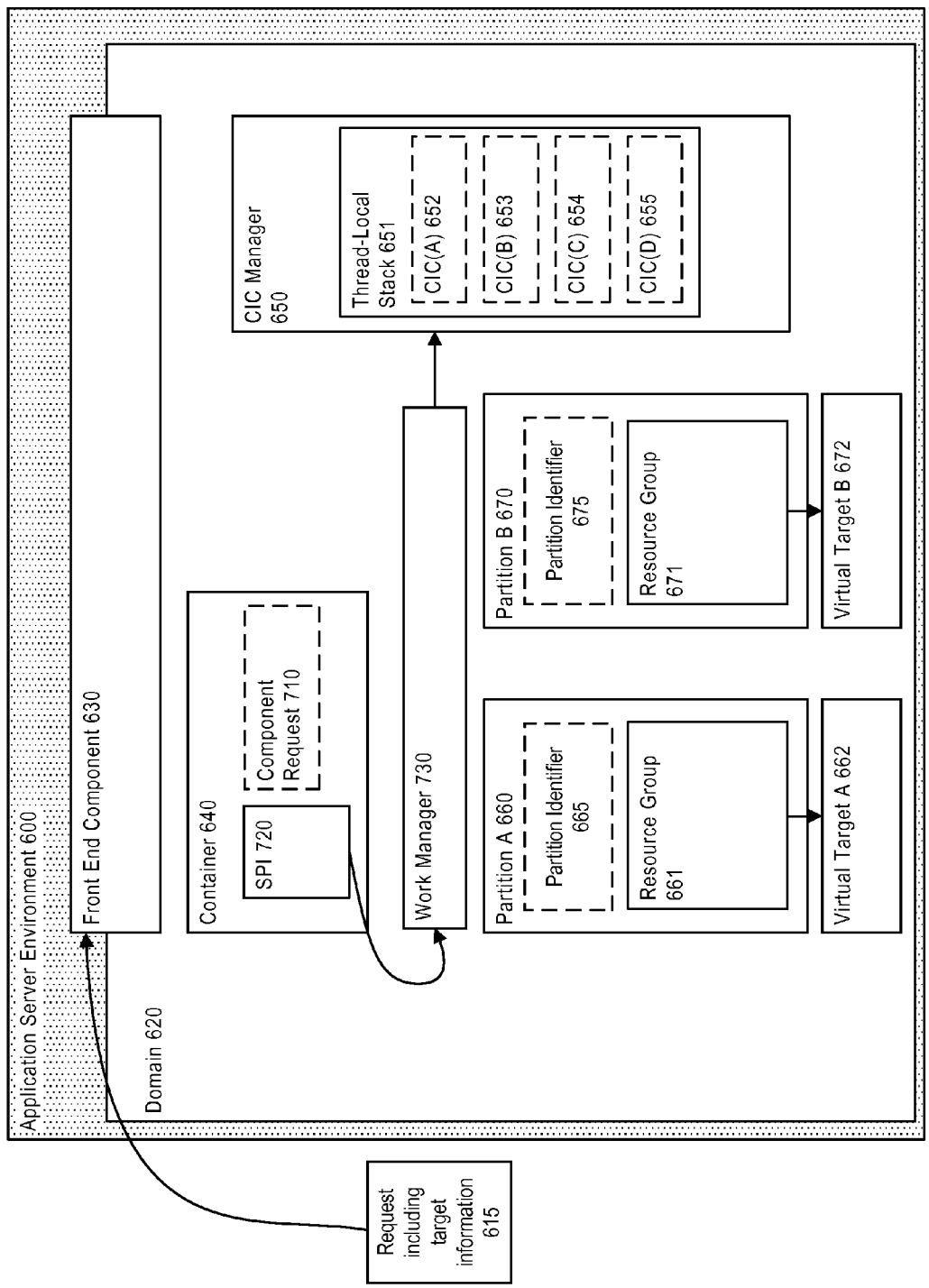
FIG. 7 illustrates determination of partition identifiers in a multitenant application server environment, in accordance with an embodiment.

FIG. 7 illustrates determination of partition identifiers in an application server environment, in accordance with an embodiment. In the embodiment depicted in FIG. 7, an application server environment 600 includes a domain 620. The domain 620 can be associated with a front end component 630, and can include container 640, which can include a service provider interface 720. The domain can further include work manager 730, component invocation context manager (CIC manager) 650, partition A 660, partition B 670, virtual target A 662, and virtual target B 672. The front end component can be any front end component capable of handling incoming requests, such as, for example, Oracle™ Traffic Director. The container 640 can be a partition aware container, such as, for example, JNDI, JMX, Logging, RCM, and the like. Partitions A and B can contain resource groups 661 and 671, respectively. Resource groups 661 and 671 can be associated with virtual targets A and B, 662 and 672, respectively. The CIC manager 650 can contain a stack, such as a thread-local stack 651.

In accordance with an embodiment, a user can initiate a request 615, wherein the request includes target information for the target of the request within the domain 620. For example, a user, processor, or other application with access to partition A 660 can request that a certain application within partition A be run. In this situation, the target information associated with the request 615 would identity, at least, partition A as the target of the request. In situation where a request originates from another partition (either within the same domain or from another domain), the component invocation context of the originated partition is not included with the request.

In accordance with an embodiment, when a request, such as request including target information 615, is directed to the domain 620, it can be routed to the front end component 630, such as a traffic director. Once received at the front end component 630, the container 640 can determine various details of the request's target component/resource. These details can be obtained, for example, by examining the target information contained within the request. Once the container 640 has determined the target component/resource of the request, the container can create a component invocation context 652, which can be an object to represent the invocation. In accordance with an embodiment, the determined component invocation context 652 can be associated with, dependent upon the request, partition identifier 665 or 675.

In accordance with an embodiment, once the container makes a determination and creates component invocation context of an incoming request, i.e., the object, the container can cause, indirectly, the component invocation context to be registered in the component invocation context manager 650, which can contain a stack, such as thread-local stack 651 which in turn includes various component invocation contexts, e.g., component invocation contexts (A)-(D) 652-655. The thread-local stack 651 can contain any number of component invocation contexts and is not limited to the four component invocation contexts as depicted in FIG. 7. The component invocation context manager 650 can allow for look-up, registration and un-registration of a current component invocation context.

In accordance with an embodiment, indirect registration of a component invocation context can be performed by the work manager 730. For example, the container 640 can dispatch a next-level processing of the request asynchronously in a separate thread, through the work manager 730. The SPI can facilitate the component context setting in the thread. A component request interface 710 can be provided by the container 640 that can allow the work associated with the request to be executed according to its own component invocation context. The component request interface 710 can also include a command, such as getComponentInvocationContext, for the container to provide the target component details (i.e., a component invocation context return value). Before a component request 710 instance is executed, the work manager 730 can lookup the component invocation context manager 650 and register a new component invocation context using the component invocation context provided by the getComponentInvocationContext command. Once the component request 710 instance's execution is complete, the work manager 730 can automatically remove the component invocation context from the component invocation context manager.

In accordance with an embodiment, the CIC manager can maintain a CIC state on a per-thread basis by using the thread-local stack for the current invocation request because a request is typically associated with a single thread. In situations where work for a request is handled by a plurality of threads, the container that executes the work in a different thread can utilized the getComponentInvocationContext command, as described above, to ensure that the thread's CIC is passed onto a new thread.

Figure 8:
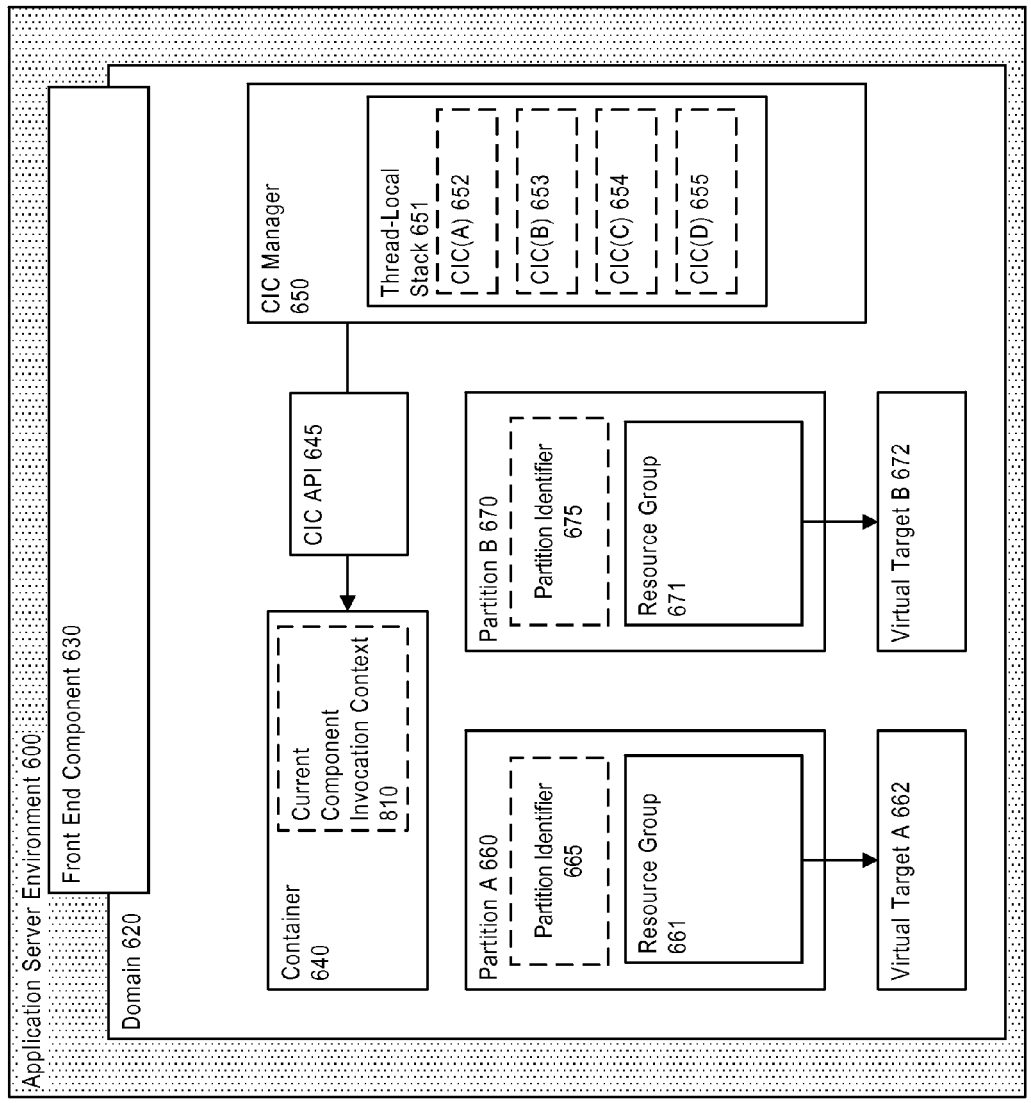
FIG. 8 illustrates determination of partition identifiers in a multitenant application server environment, in accordance with an embodiment.

FIG. 8 illustrates determination of partition identifiers in an application server environment, in accordance with an embodiment. In the embodiment depicted in FIG. 8, an application server environment 600 includes a domain 620. The domain 620 includes a front end component 630, container 640, CIC API 645, component invocation context manager (CIC manager) 650, partition A 660, partition B 670, virtual target A 662, and virtual target B 672. The front end component can be any front end component capable of handling incoming requests, such as, for example, Oracle™ Traffic Director. The container 640 can be a partition aware container, such as, for example, JNDI, JMX, Logging, RCM, and the like. Partitions A and B can contain resource groups 661 and 671, respectively. Resource groups 661 and 671 can be associated with virtual targets A and B, 662 and 672, respectively. The CIC manager 650 can contain a stack, such as thread-local stack 651.

In accordance with an embodiment, a container 640 can retrieve the current component invocation context from the component invocation manager through an API 645 via a command, such as getCurrentComponentInvocation. For example, as depicted in FIG. 8, the component invocation context manager is currently set on component invocation context 652, out of the possible component invocation contexts, e.g., component invocation contexts (A)-(D) 652-655. A container, 640, can get the current component invocation context 810, via the API 645, from the component invocation context manager 650.

Figure 9:
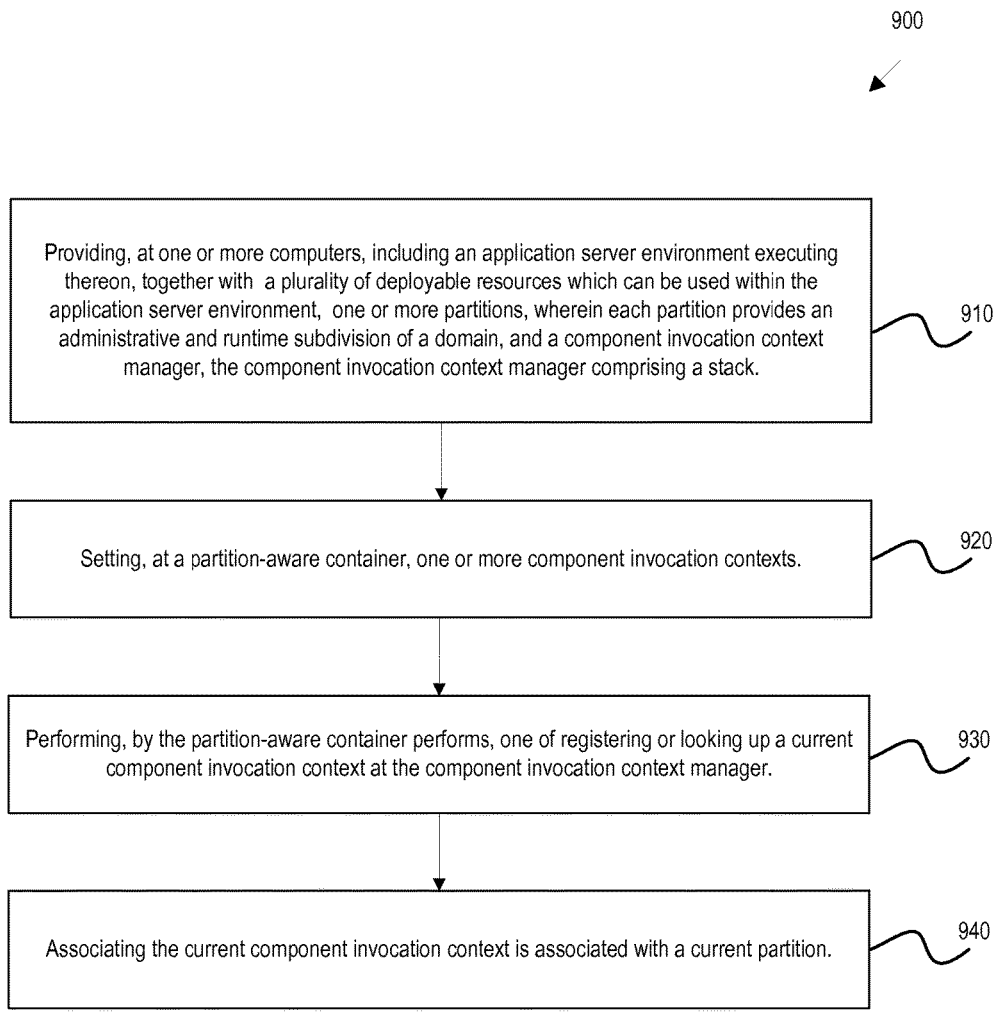
FIG. 9 illustrates, via a flow chart, a method for determination of partition identifiers in a multitenant application server environment, in accordance with an embodiment.

FIG. 9 illustrates, via a flow chart, a method for determination of partition identifiers in a multitenant application server environment, in accordance with an embodiment. The exemplary method 900 can begin at step 910 with providing, at one or more computers, including an application server environment executing thereon, together with a plurality of deployable resources which can be used within the application server environment, one or more partitions, wherein each partition provides an administrative and runtime subdivision of a domain, and a component invocation context manager, the component invocation context manager comprising a stack. The method continues at step 920 where the method can set, at a partition-aware container, one or more component invocation contexts. At step 930, the exemplary method continues by performing, by the partition-aware container performs, one of registering or looking up a current component invocation context at the component invocation context manager. The exemplary method can conclude at step 940 by associating the current component invocation context with a current partition.

Propagation of Component Invocation Context

In accordance with an embodiment, a component invocation context manager can be responsible for the propagation of the component invocation context details throughout the duration of associated request. Partition context information can be propagated throughout a local invocation. Other sub-contexts of the component invocation context can be determined by respective containers as based on which component is involved in handling the request. The component invocation context can be automatically inherited whenever a new thread is spawned, irrespective of which API is used to spawn the thread.

Retrieving the Component Invocation Context

As mentioned above, in accordance with an embodiment, any internal code or container (such as JNDI) that requires the component invocation context details (e.g., Partition Id), can lookup the component invocation context manager to determine the current component invocation context through a method, such as getCurrentComponentInvocation. The partition ID of the component invocation context can have several values, including global partition ID and user partition ID.

In accordance with an embodiment, a global partition ID can be used in the following circumstances. When a server determines that the target component of a request resides in a global partition (i.e., the domain), the container can set the partition ID to the global partition's ID. Additionally, the global partition ID can be used for internal server activities that are not specific to a user partition (e.g., initialization/shutdown of server runtime, loading of a container, and the like). When such activities in the server runtime are not specifically performed on behalf of a partition, the container can set the partition ID to the global partition's ID. Other embodiments can differentiated between global partition work and shared work by having a partition id represented a shared system partition.

In accordance with an embodiment, a user partition ID can be used in the following circumstances. When a request is targeted to a component residing in a user partition, the server can set the partition ID to the user partition's ID. Additionally, if any server activity is specially carried out for a partition (e.g., automatic rotation of log files for a particular partition), the partition's ID can be set in the component invocation context.

In accordance with an embodiment, the current component invocation context is a non-null value. For example, in a situation where a thread does not have a context established, a non-null component invocation context that represents a global partition (i.e., having null values for application, module, and component ID and names) can be returned. As another example, in a situation where a thread is created, and a new context is not established in that thread, the thread can automatically inherit the context of the creating thread.

Component Invocation Context Stack

In accordance with an embodiment, in situations where a request spans multiple components (e.g., as a local call to another component—for example, a Servlet calling an enterprise JavaBean (EJB)), the target container (in this example, the EJB container) can establish a new component invocation context which contains the new module and component ID before handling the EJB invocation. The target container can also unset the component invocation context on the successful completion of the EJB call. The component invocation context manager can internally manage a list of component invocation as a stack. The stack can represent component invocation contexts associated with local calls made within the context of an invocation.

As an example, in a situation where a servlet S1 calls a local EJB E1. The component invocation context manager can internally maintain a stack of component invocation contexts corresponding to servlet S1 and EJB E1. During the execution of the EJB E1, a call to componentinvocationcmanagergetCurrentComponentInvocationContext( ), can return the component invocation context corresponding to E1 as the current component invocation context. As soon as the execution of EJB E1 completes, the EJB container can unset the component invocation context corresponding to E1, and the component invocation context manager would then establish component invocation context corresponding to S1 as the current invocation context for any subsequent calls to componentinvocationcontextmanager.getCurrentComponentInvocationContext( ).

In accordance with an embodiment, an internal method to retrieve all the invocation objects in the stack can also be made available.

API

In accordance with an embodiment, examples of API classes and interfaces are listed here:

```
package weblogic.invocation;
/**
 * Information about the current request executed by a component in the
 * server. Currently the information exposed in this interface is related to
 * the target component which is executing the request. In future,
 * more information can be exposed via this interface.
 */
public interface ComponentInvocationContext {
/**
 * Returns the ID of the Partition Id that the component that's being
 * invoked resides. If the component belongs to no partition or belongs to
 * the GLOBAL partition, this method must return the GLOBAL partition's
 * uuid.
 * @return the Partition UUID
 */
String getPartitionId( );
/**
 * This method is similar to #getPartitionId except that it returns the
 human readable name instead of ID.
 *
 * @return the Partition name
 */
String getPartitionName( );
/**
 * Return if the partition is global or not
 *
 * @return boolean value
 */
```

```
boolean isGlobalRuntime( );
/**
 * Returns the ID of the application that contains the component
 * being invoked currently. It is possible that the component does not
 * belong to any application in which case it returns null. This can
 * happen while accessing WLS MBeans for example.
 *
 * When there are multiple versions of the same application
 * or when an application is deployed to multiple partitions,
 * application name remains same for all those instances where as
 * application ID is unique for each instance.
 *
 * @return the Application ID
 */
String getApplicationId( );
/**
 * This method is similar to #getApplicationId except that it returns the
 * human readable same instead of ID.
 * Application name can't uniquely identify an application instance.
 *
 * @return the Application name
 */
String getApplicationName( );
/**
 * Return the version of the application containing the component being
 * invoked.
 *
 * @return the Application Version
 */
String getApplicationVersion( );
/**
 * Return the name of the applicaton module containing the component
 * being invoked. In case of standalone module deployments,
 * this is same as the name of the application.
 *
 * <p>
 * This method returns null whenever #getApplicationId returns null.
 * It can return null even if #getApplicationId returns non-null, This
 * happens when the invocation is in the context of the application, but
 * not a particular module. For instance, when an
 * ApplicationLifecycleListener receives callbacks.
 *
 * @return the Module Name
 */
String getModuleName( );
/**
 * Return the name of the component being invoked.
 *
 * @return the Component Name
 */
String getComponentName( );
}
```

In accordance with an embodiment, an exemplary implementation of an API class ComponentInvocationContextManager is provided below:

```
package weblogic.invocation;
/**
 * Allows containers in WebLogic to lookup, register and unregister the
 * current component invocation context.
 */
public abstract class ComponentInvocationContextManager {
/**
 * Returns the instance of the <code>ComponentInvocationManager</code>.
 * The implementation of the ComponentInvocationContextManager is loaded
 * through the Java SE Service Provider mechanism
 */
public static ComponentInvocationContextManager getInstance( ) {...};
/**
 * Returns the instance of the <code>ComponentInvocationManager</code>. The
 * implementation of the ComponentInvocationContextManager is loaded through
 * the Java SE Service Provider mechanism.
 *
 * Since there is a relatively expensive security check while calling this
 * method, containers should cache the instance of
 * <code>ComponentInvocationContextManager</code> returned by this method for
```

```
 * performance reasons.
 *
 * @param subject An <code>AuthenticatedSubject</code> representing the Kernel
 * identity
 * @return A <code>ComponentInvocationContextManager</code> instance.
 *        A read-only instance is returned if the subject does not
 *        represent the kernel identity
 * @throws SecurityException when the supplied subject does not represent
 *                            the kernel identity.
 */
public static ComponentInvocationContextManager getInstance(Principal subject)
{
   try {
      SingletonHolder.INSTANCE.checkIfKernel(subject);
      return SingletonHolder.INSTANCE;
   } catch (SecurityException se) {
      se.printStackTrace( );
      throw se;
   }
}
/**
 * Factory method for creating a ComponentInvocationContext.
 * This is available as a convenience only. Users of this class are free
 * to create their own implementation of ComponentInvocationContext.
 * @param applicationId
 * @param moduleName
 * @param componentName
 * @return
 */
public abstract ComponentInvocationContext createComponentInvocationContext(
   String applicationId,
   String moduleName,
   String componentName
   );
/**
 * Factory method for creating a ComponentInvocationContext.
 * This is available as a convenience only. Users of this class are free
 * to create their own implementation of ComponentInvocationContext.
 * @param partitionName
 * @param applicationName
 * @param applicationVersion
 * @param moduleName
 * @param componentName
 * @return
 */
public abstract ComponentInvocationContext createComponentInvocationContext(
   String partitionName,
   String applicationName,
   String applicationVersion,
   String moduleName,
   String componentName
   );
/**
 * Factory method for creating a ComponentInvocationContext.
 * This is available as a convenience only. Users of this class are free
 * to create their own implementation of ComponentInvocationContext.
 *
 * calling this method has the same effect of calling
 * the other factory method with all parameters except partitionName as
 * null.
 */
public ComponentInvocationContext createComponentInvocationContext(String
partitionName);
/**
 * Returns the Component Invocation Context associated with the current
 * thread. For threads where a CIC is not established, a non-null
 * ComponentInvocationContext instance representing the global partition
 * is returned.
 */
   public abstract ComponentInvocationContext
getCurrentComponentInvocationContext( );
/**
 * Allows a container to push a new Component Invocation Context for the
 * current request.
 * @param ci The component invocation context to be pushed. This
must not be null.
 */
public abstract void pushComponentInvocationContext(ComponentInvocationContext
ci);
```

-continued

```
/**
 * Allows a container to unset the current Component Invocation Context in the
 * top of the invocation context stack for the current request.
 */
public abstract void popComponentInvocationContext( );
/**
 * Allows a container to run an action in the context of a
 * ComponentInvocationContext.
 *
 * @param ci      The context in which the action must be performed.
 * @param action  The action to be performed
 * @throws ExecutionException   when the supplied action aborts
 *                              by throwing any exception. Use #getCause to see
 *                              the underlying exception.
 */
public static <T> T runAs(ComponentInvocationContext ci,
              Callable<T> action) throws ExecutionException;
/**
 * Allows a container to run an action in the context of a
 * ComponentInvocationContext. This method is similar to {#runAs(Callable)}
 * except that this accepts a Runnable instead of a Callable.
 *
 * @param ci                 The context in which the action must be performed.
 * @param action             The action to be performed
 * @throws ExecutionException   when the supplied action aborts by throwing
 *                              any exception. Use #getCause to see the
 *                              underlying exception.
 */
public static void runAs(ComponentInvocationContext ci,
Runnable action) throws ExecutionException;
/**
 * Establishes the provided Component Invocation Context for the current request.
 *
 * As this method returns an <code>AutoCloseable</code> instance, this method
 * may be used in a try-with-resources expression to have the
 * {@link #ComponentInvocationContextManager( )} automatically manage the
 * establishment and unsetting of the context.
 *
 * For example:
 * <pre>
 * { @code
 * ComponentInvocationContextManager cicm =
 * ComponentInvocationContextManager.getInstance(Principal);
 * ComponentInvocationContext cic = //CIC to establish ...
 * try (ManagedInvocationContext mic =
 * cicm.setCurrentComponentInvocationContext(cic)) {
 * ...
 * }
 * }
 * </pre>
 *
 * In this case, the <code>cic</code> is automatically popped at the end of the
 * try block, and an explicit pop/close is not required.
 *
 * @return An <code>AutoCloseable</code> <code>ManagedInvocationContext</code>
 instance.
 */
public abstract ManagedInvocationContext setCurrentComponentInvocationContext(
Component InvocationContext
 * Adds a listener to the list that is notified every time the
 * component invocation context changes.
 *
 * @param ic the invocation context change listener
 */
public void
addInvocationContextChangeListener(ComponentInvocationContextChangeListener
ic);
/**
 * Removes a listener from the list that is notified every time the
 * component invocation context changes.direc
 *
 * @param ic the invocation context change listener
 */
public void
removeInvocationContextChangeListener(ComponentInvocationContextChangeListener
ic);
}
```

A further exemplary API is provided here:

```
package weblogic.invocation;
/**
* Represents a managed Component Invocation Context and may be
* used in a try-with-resources statement to establish a component
* invocation context within the try block, and have it automatically
* restored at the end of the try block.
*
*/
public class ManagedInvocationContext implements AutoCloseable {
private final ComponentInvocationContext invocationContext;
private final Object token;
/**
* Constructs a Managed Invocation Context
*
* @param cic the Component Invocation Context to establish
* @param token an opaque Token provided by a
* <code>ComponentInvocationContextManager</code>
* implementation, so that subsequent pops through
* (@link
ComponentInvocationContextManager#_managedPop-
(ManagedInvocationContext)}
* may be verified, to prevent unsetting of inappropriate Contexts.
*/
public ManagedInvocationContext (ComponentInvocationContext cic,
Object token)
{
this.invocationContext = cic;
this.token = token;
}
/**
* Unset the current invocation context from the top of the component
* invocation stack of the current request.
*
* @see java.lang.AutoCloseable#close( )
* @throws An IllegalStateException if the invocation context cannot be
* unset, because of an inappropriate request or an empty stack.
*/
@Override
public void close( ) {
//_managedPop verifies the token in this object before popping
ComponentInvocationContextManager.
getInstance( )._managedPop(token);
}
/**
* @see java.lang.Object#toString( )
*/
@Override
public String toString( ) {
    return "ManagedInvocationContext [invocationContext=
    " + invocationContext
       + ", token=" + token + "]";
    }
}
```

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for determination of partition identifiers in an application server environment, comprising:
one or more computers, including an application server environment executing thereon, together with
a plurality of deployable resources which can be used within the application server environment, and
one or more partitions including a targeted partition, wherein each partition provides an administrative and runtime subdivision of a domain, and is associated with a partition identifier, and wherein the targeted partition defines values of configuration data for a collection of the deployable resources for use with the targeted partition, and binds the collection of deployable resources to the defined values for use with the targeted partition;
a partition-aware container that determines that a target resource of a request is included in the collection of deployable resources of the targeted partition, and sets a component invocation context that is associated with the partition identifier of the targeted partition;
a component invocation context manager, the component invocation context manager including a stack for maintaining component invocation contexts;
wherein the partition-aware container performs one of registering the component invocation context that is associated with the partition identifier of the targeted partition by pushing the component invocation context that represents the request onto the stack, or looking up a current component invocation context at the component invocation context manager by requesting the current component invocation context from the stack.

2. The system of claim 1, wherein registering the component invocation context that is associated with the partition identifier of the targeted partition comprises:
receiving, at a front end component, the request including target information, the target information indicating the targeted partition; and
wherein pushing the component invocation context that is associated with the partition identifier of the targeted partition onto the stack includes making a call, by the partition-aware container, to an application programming interface of the component invocation context manager.

3. The system of claim 2, wherein the partition-aware container is configured to, after registering the component invocation context that is associated with the partition identifier of the targeted partition at the component invocation context manager, and upon completion of the request, unregister the component invocation context that is associated with the partition identifier of the targeted partition at the component invocation context manager, the unregistering comprising:
unregistering, by the partition-aware container via the application program interface, the component invocation context that is associated with the partition identifier of the targeted partition at the component invocation context manager.

4. The system of claim 1, further comprising
a work manager,
wherein registering the component invocation context that is associated with the partition identifier of the targeted partition at the component invocation context manager by the partition-aware container comprises passing instructions by the partition-aware container to the work manager to register the component invocation context that is associated with the partition identifier of the targeted partition at the component invocation context manager.

5. The system of claim 1, wherein looking up the current component invocation context comprises:
setting, as the context within the partition-aware container, the current component invocation context.

6. The system of claim 1, wherein the targeted partition is a global partition, the global partition being associated with the domain.

7. The system of claim 1, wherein the application server environment comprises a multi-tenant application server environment, and wherein the system can associate the one or more partitions with a tenant, for use by the tenant.

8. A method for determination of partition identifiers in an application server environment, comprising:
providing, at one or more computers, an application server environment executing thereon, together with
a plurality of deployable resources which can be used within the application server environment,
one or more partitions including a targeted partition, wherein each partition provides an administrative and runtime subdivision of a domain, and is associated with a partition identifier, and wherein the targeted partition defines values of configuration data for a collection of the deployable resources for use with the targeted partition, and binds the collection of deployable resources to the defined values for use with the targeted partition, and
a component invocation context manager, the component invocation context manager comprising a stack for maintaining component invocation contexts;
determining, at a partition-aware container, that a target resource of a request is included in the collection of deployable resources of the targeted partition;
setting, at the partition-aware container, a component invocation context that is associated with the partition identifier of the targeted partition;
performing, by the partition-aware container performs, one of
registering the component invocation context that is associated with the partition identifier of the targeted partition by pushing the component invocation context that represents the request onto the stack, or
looking up a current component invocation context at the component invocation context manager by requesting the current component invocation context from the stack.

9. The method of claim 8, wherein registering the current component invocation context that is associated with the partition identifier of the targeted partition comprises:
receiving, at a front end component, the request including target information, the target information indicating the targeted partition; and
wherein pushing the component invocation context that is associated with the partition identifier of the targeted partition onto the stack includes making a call, by the partition-aware container, to an application programming interface of the component invocation context manager.

10. The method of claim 9, wherein the partition-aware container is configured to, after registering the component invocation context that is associated with the partition identifier of the targeted partition at the component invocation context manager, and upon completion of the request, unregister the component invocation context that is associated with the partition identifier of the targeted partition at the component invocation context manager, the unregistering comprising:
unregistering, by the partition-aware container via the application program interface, the component invocation context that is associated with the partition identifier of the targeted partition at the component invocation context manager.

11. The method of claim 8, further comprising:
further providing, at the one or more computers, including an application server environment executing thereon, a work manager; and
wherein registering the component invocation context that is associated with the partition identifier of the targeted partition at the component invocation context manager by the partition-aware container comprises passing instructions by the partition-aware container to the work manager to register the component invocation context that is associated with the partition identifier of the targeted partition at the component invocation context manager.

12. The method of claim 8, wherein looking up the current component invocation context comprises:
setting, as the context within the partition-aware container, the current component invocation context.

13. The method of claim 8, wherein the targeted partition is a global partition, the global partition being associated with the domain.

14. The method of claim 8, wherein the application server environment comprises a multi-tenant application server environment, the method further comprising:
associating the one or more partitions with a tenant, for use by the tenant.

15. A non-transitory computer readable storage medium, including instructions stored thereon for determination of partition identifiers in an application server environment which when read and executed by one or more computers cause the one or more computers to perform steps comprising:
providing, at one or more computers, an application server environment executing thereon, together with
a plurality of deployable resources which can be used within the application server environment,
one or more partitions including a targeted partition, wherein each partition provides an administrative and runtime subdivision of a domain, and is associated with a partition identifier, and wherein the targeted partition defines values of configuration data for a collection of the deployable resources for use with the targeted partition, and binds the collection of deployable resources to the defined values for use with the targeted partition, and a component invocation context manager, the component invocation context manager comprising a stack for maintaining component invocation contexts;

determining, at a partition-aware container, that a target resource of a request is included in the collection of deployable resources of the targeted partition;

setting, at the partition-aware container, a component invocation context that is associated with the partition identifier of the targeted partition;

performing, by the partition-aware container performs, one of registering the component invocation context that is associated with the partition identifier of the targeted partition by pushing the component invocation context that represents the request onto the stack, or looking up a current component invocation context at the component invocation context manager by requesting the current component invocation context from the stack.

16. The non-transitory computer readable storage medium of claim 15, wherein registering the current component invocation context that is associated with the partition identifier of the targeted partition comprises:

receiving, at a front end component, the request including target information, the target information indicating the targeted partition; and wherein pushing the component invocation context that is associated with the partition identifier of the targeted partition onto the stack includes making a call, by the partition-aware container, to an application programming interface of the component invocation context manager.

17. The non-transitory computer readable storage medium of claim 16, wherein the partition-aware container is configured to, after registering the component invocation context that is associated with the partition identifier of the targeted partition at the component invocation context manager, and upon completion of the request, unregister the component invocation context that is associated with the partition identifier of the targeted partition at the component invocation context manager, the unregistering comprising:

unregistering, by the partition-aware container via the application program interface, the component invocation context that is associated with the partition identifier of the targeted partition at the component invocation context manager.

18. The non-transitory computer readable storage medium of claim 15, the steps further comprising:

further providing, at the one or more computers, including an application server environment executing thereon, a work manager; and wherein registering the component invocation context that is associated with the partition identifier of the targeted partition at the component invocation context manager by the partition-aware container comprises passing instructions by the partition-aware container to the work manager to register the component invocation context that is associated with the partition identifier of the targeted partition at the component invocation context manager.

19. The non-transitory computer readable storage medium of claim 15, wherein looking up the current component invocation context comprises:

setting, as the context within the partition-aware container, the current component invocation context.

20. The non-transitory computer readable storage medium of claim 15, wherein the targeted partition is a global partition, the global partition being associated with the domain.

* * * * *

UNITED STATES PATENT AND TRADEMARK OFFICE
CERTIFICATE OF CORRECTION

PATENT NO. : 10,104,011 B2
APPLICATION NO. : 14/866515
DATED : October 16, 2018
INVENTOR(S) : Sahoo et al.

Page 1 of 1

It is certified that error appears in the above-identified patent and that said Letters Patent is hereby corrected as shown below:

In the Specification

In Column 12, Line 35, delete "can" and insert -- can be --, therefor.

In Column 14, Line 28, delete "applicaton" and insert -- application --, therefor.

Signed and Sealed this
Thirty-first Day of December, 2019

Andrei Iancu
*Director of the United States Patent and Trademark Office*